United States Patent
Maxik et al.

(10) Patent No.: US 9,681,522 B2
(45) Date of Patent: Jun. 13, 2017

(54) ADAPTIVE LIGHT SYSTEM AND ASSOCIATED METHODS

(71) Applicant: LIGHTING SCIENCE GROUP CORPORATION, Satellite Beach, FL (US)

(72) Inventors: Fredric S. Maxik, Indialantic, FL (US); Robert R. Soler, Cocoa Beach, FL (US); David E. Bartine, Cocoa, FL (US); Matthew Regan, Melbourne, FL (US); Eliza Katar Grove, Satellite Beach, FL (US); Valerie A. Bastien, Melbourne, FL (US); Mark Andrew Oostdyk, Cape Canaveral, FL (US)

(73) Assignee: Lighting Science Group Corporation, Melbourne, FL (US)

( * ) Notice: Subject to any disclaimer, the term of this patent is extended or adjusted under 35 U.S.C. 154(b) by 11 days.

(21) Appl. No.: 13/775,936

(22) Filed: Feb. 25, 2013

(65) Prior Publication Data
US 2013/0293158 A1 Nov. 7, 2013

Related U.S. Application Data

(60) Provisional application No. 61/643,316, filed on May 6, 2012.

(51) Int. Cl.
H05B 37/02 (2006.01)
H05B 33/08 (2006.01)

(52) U.S. Cl.
CPC ..... *H05B 37/0245* (2013.01); *H05B 33/0803* (2013.01)

(58) Field of Classification Search
CPC .............. H05B 33/0863; H05B 33/086; H05B 33/0869; G01J 3/642
See application file for complete search history.

(56) References Cited

U.S. PATENT DOCUMENTS 1,768,812 A * 7/1930 Whiting ................... 359/601
5,523,878 A 6/1996 Wallace et al.
(Continued)

FOREIGN PATENT DOCUMENTS

CN 101702421 A 5/2010
DE 20 2011 000007 U1 4/2012
(Continued)

OTHER PUBLICATIONS

U.S. Appl. No. 13/311,300, filed Dec. 2011, Fredric S. Maxik et al.
(Continued)

*Primary Examiner* — Alexander H Taningco
*Assistant Examiner* — Christine Johnson
(74) *Attorney, Agent, or Firm* — Mark Malek; Daniel Pierron; Widerman Malek, PL

(57) ABSTRACT

An adaptive light system including a color matching engine, a controller, and a plurality of light sources each configured to emit a source light. The color matching engine determines a dominant wavelength of a selected color, and a combination of the light sources that the controller may operate to emit a combined wavelength that approximately matches the dominant wavelength of the selected color. A color capture device transmits a source color signal designating the selected color. A method of adapting light comprises receiving a selected color, converting a value representing a dominant wavelength of the selected color, determining a combination of and percentages of colors emitted by the plurality of light sources that may be combined to form an adapted light that matches the selected color, and operating the light sources along with a white light to emit the adapted light.

16 Claims, 10 Drawing Sheets

(56) References Cited

U.S. PATENT DOCUMENTS

| | | |
|---|---|---|
| 5,680,230 A | 10/1997 | Kaburagi et al. |
| 5,704,701 A | 1/1998 | Kavanagh et al. |
| 5,813,753 A | 9/1998 | Vriens et al. |
| 5,997,150 A | 12/1999 | Anderson |
| 6,140,646 A | 10/2000 | Busta et al. |
| 6,259,572 B1 | 7/2001 | Meyer, Jr. |
| 6,341,876 B1 | 1/2002 | Moss et al. |
| 6,356,700 B1 | 3/2002 | Strobl |
| 6,450,652 B1 | 9/2002 | Karpen |
| 6,459,919 B1 | 10/2002 | Lys et al. |
| 6,528,954 B1 | 3/2003 | Lys et al. |
| 6,550,949 B1 | 4/2003 | Bauer et al. |
| 6,561,656 B1 | 5/2003 | Kojima et al. |
| 6,577,080 B2 | 6/2003 | Lys et al. |
| 6,586,882 B1 | 7/2003 | Harbers |
| 6,594,090 B2 | 7/2003 | Kruschwitz et al. |
| 6,733,135 B2 | 5/2004 | Dho |
| 6,734,639 B2 | 5/2004 | Chang et al. |
| 6,762,562 B2 | 7/2004 | Leong |
| 6,767,111 B1 | 7/2004 | Lai |
| 6,787,999 B2 | 9/2004 | Stimac et al. |
| 6,817,735 B2 | 11/2004 | Shimizu et al. |
| 6,870,523 B1 | 3/2005 | Ben-David et al. |
| 6,871,982 B2 | 3/2005 | Holman et al. |
| 6,909,377 B2 | 6/2005 | Eberl |
| 6,967,761 B2 | 11/2005 | Starkweather et al. |
| 6,974,713 B2 | 12/2005 | Patel et al. |
| 7,009,343 B2 | 3/2006 | Lim et al. |
| 7,034,934 B2 | 4/2006 | Manning |
| 7,042,623 B1 | 5/2006 | Huibers et al. |
| 7,058,197 B1 | 6/2006 | McGuire et al. |
| 7,070,281 B2 | 7/2006 | Kato |
| 7,072,096 B2 | 7/2006 | Holman et al. |
| 7,075,707 B1 | 7/2006 | Rapaport et al. |
| 7,083,304 B2 | 8/2006 | Rhoads |
| 7,095,053 B2 | 8/2006 | Mazzochette et al. |
| 7,144,131 B2 | 12/2006 | Rains |
| 7,157,745 B2 | 1/2007 | Blonder et al. |
| 7,178,941 B2 | 2/2007 | Roberge et al. |
| 7,184,201 B2 | 2/2007 | Duncan |
| 7,187,484 B2 | 3/2007 | Mehrl |
| 7,213,926 B2 | 5/2007 | May et al. |
| 7,234,844 B2 | 6/2007 | Bolta et al. |
| 7,246,923 B2 | 7/2007 | Conner |
| 7,247,874 B2 | 7/2007 | Bode et al. |
| 7,252,408 B2 | 8/2007 | Mazzochete et al. |
| 7,255,469 B2 | 8/2007 | Wheatley et al. |
| 7,261,453 B2 | 8/2007 | Morejon et al. |
| 7,289,090 B2 | 10/2007 | Morgan |
| 7,300,177 B2 | 11/2007 | Conner |
| 7,303,291 B2 | 12/2007 | Ikeda et al. |
| 7,319,293 B2 | 1/2008 | Maxik |
| 7,324,076 B2 | 1/2008 | Lee et al. |
| 7,325,956 B2 | 2/2008 | Morejon et al. |
| 7,342,658 B2 | 3/2008 | Kowarz et al. |
| 7,344,279 B2 | 3/2008 | Mueller et al. |
| 7,349,095 B2 | 3/2008 | Kurosaki |
| 7,353,859 B2 | 4/2008 | Stevanovic et al. |
| 7,369,056 B2 | 5/2008 | McCollough et al. |
| 7,382,091 B2 | 6/2008 | Chen |
| 7,382,632 B2 | 6/2008 | Alo et al. |
| 7,400,439 B2 | 7/2008 | Holman |
| 7,427,146 B2 | 9/2008 | Conner |
| 7,429,983 B2 | 9/2008 | Islam |
| 7,434,946 B2 | 10/2008 | Huibers |
| 7,436,996 B2 | 10/2008 | Ben-Chorin |
| 7,438,443 B2 | 10/2008 | Tatsuno et al. |
| 7,476,016 B2 | 1/2009 | Kurihara |
| 7,482,636 B2 | 1/2009 | Murayama et al. |
| 7,497,596 B2 | 3/2009 | Ge |
| 7,507,001 B2 | 3/2009 | Kit |
| 7,520,607 B2 | 4/2009 | Casper et al. |
| 7,520,642 B2 | 4/2009 | Holman et al. |
| 7,521,875 B2 | 4/2009 | Maxik |
| 7,524,097 B2 | 4/2009 | Turnbull et al. |
| 7,528,421 B2 | 5/2009 | Mazzochete |
| 7,530,708 B2 | 5/2009 | Park |
| 7,537,347 B2 | 5/2009 | Dewald |
| 7,540,616 B2 | 6/2009 | Conner |
| 7,556,376 B2 | 7/2009 | Ishak et al. |
| 7,556,406 B2 | 7/2009 | Petroski et al. |
| 7,573,210 B2 | 8/2009 | Ashdown et al. |
| 7,598,686 B2 | 10/2009 | Lys et al. |
| 7,598,961 B2 | 10/2009 | Higgins |
| 7,605,971 B2 | 10/2009 | Ishii et al. |
| 7,619,372 B2 | 11/2009 | Garrity |
| 7,626,755 B2 | 12/2009 | Furuya et al. |
| 7,633,093 B2 | 12/2009 | Blonder et al. |
| 7,633,779 B2 | 12/2009 | Garrity et al. |
| 7,637,643 B2 | 12/2009 | Maxik |
| 7,677,736 B2 | 3/2010 | Kasazumi et al. |
| 7,678,140 B2 | 3/2010 | Brainard et al. |
| 7,679,281 B2 | 3/2010 | Kim et al. |
| 7,684,007 B2 | 3/2010 | Hull et al. |
| 7,703,943 B2 | 4/2010 | Li et al. |
| 7,705,810 B2 | 4/2010 | Choi et al. |
| 7,708,452 B2 | 5/2010 | Maxik et al. |
| 7,709,811 B2 | 5/2010 | Conner |
| 7,719,766 B2 | 5/2010 | Grasser et al. |
| 7,728,846 B2 | 6/2010 | Higgins et al. |
| 7,732,825 B2 | 6/2010 | Kim et al. |
| 7,748,845 B2 | 7/2010 | Casper et al. |
| 7,766,490 B2 | 8/2010 | Harbers et al. |
| 7,819,556 B2 | 10/2010 | Heffington et al. |
| 7,828,453 B2 | 11/2010 | Tran et al. |
| 7,828,465 B2 | 11/2010 | Roberge et al. |
| 7,832,878 B2 | 11/2010 | Brukilacchio et al. |
| 7,834,867 B2 | 11/2010 | Sprague et al. |
| 7,835,056 B2 | 11/2010 | Doucet et al. |
| 7,841,714 B2 | 11/2010 | Grueber |
| 7,845,823 B2 | 12/2010 | Mueller et al. |
| 7,855,376 B2 | 12/2010 | Cantin et al. |
| 7,871,839 B2 | 1/2011 | Lee |
| 7,880,400 B2 | 2/2011 | Zhoo et al. |
| 7,889,430 B2 | 2/2011 | El-Ghoroury et al. |
| 7,906,789 B2 | 3/2011 | Jung et al. |
| 7,928,565 B2 | 4/2011 | Brunschwiler et al. |
| 7,972,030 B2 | 7/2011 | Li |
| 7,976,182 B2 | 7/2011 | Ribarich |
| 7,976,205 B2 | 7/2011 | Grotsch et al. |
| 8,016,443 B2 | 9/2011 | Falicoff et al. |
| 8,040,070 B2 | 10/2011 | Myers et al. |
| 8,047,660 B2 | 11/2011 | Penn et al. |
| 8,049,763 B2 | 11/2011 | Kwak et al. |
| 8,061,857 B2 | 11/2011 | Liu et al. |
| 8,070,302 B2 | 12/2011 | Hatanaka et al. |
| 8,076,680 B2 | 12/2011 | Lee et al. |
| 8,083,364 B2 | 12/2011 | Allen |
| 8,096,668 B2 | 1/2012 | Abu-Ageel |
| 8,096,675 B1 | 1/2012 | Posselt |
| 8,115,419 B2 | 2/2012 | Given et al. |
| 8,164,844 B2 | 4/2012 | Toda et al. |
| 8,182,106 B2 | 5/2012 | Shin |
| 8,182,115 B2 | 5/2012 | Takahashi et al. |
| 8,188,687 B2 | 5/2012 | Lee et al. |
| 8,192,047 B2 | 6/2012 | Bailey et al. |
| 8,207,676 B2 | 6/2012 | Hilgers |
| 8,212,836 B2 | 7/2012 | Matsumoto et al. |
| 8,253,336 B2 | 8/2012 | Maxik et al. |
| 8,256,921 B2 | 9/2012 | Crookham |
| 8,274,089 B2 | 9/2012 | Lee |
| 8,297,783 B2 | 10/2012 | Kim |
| 8,304,978 B2 | 11/2012 | Kim et al. |
| 8,310,171 B2 | 11/2012 | Reisenauer et al. |
| 8,319,445 B2 | 11/2012 | McKinney et al. |
| 8,324,808 B2 | 12/2012 | Maxik et al. |
| 8,324,823 B2 | 12/2012 | Choi et al. |
| 8,324,840 B2 | 12/2012 | Shteynberg et al. |
| 8,331,099 B2 | 12/2012 | Geissler et al. |
| 8,337,029 B2 | 12/2012 | Li |
| 8,378,574 B2 | 2/2013 | Schlangen et al. |
| 8,401,231 B2 | 3/2013 | Maxik et al. |
| 8,491,165 B2 | 7/2013 | Bretschneider et al. |
| 2002/0113555 A1 | 8/2002 | Lys et al. |

(56) References Cited

U.S. PATENT DOCUMENTS

| | | |
|---|---|---|
| 2004/0052076 A1 | 3/2004 | Mueller |
| 2004/0093045 A1 | 5/2004 | Bolta |
| 2004/0119086 A1 | 6/2004 | Yano et al. |
| 2005/0189557 A1 | 9/2005 | Mazzochete et al. |
| 2005/0200295 A1* | 9/2005 | Lim .................... G09G 3/3413 315/150 |
| 2005/0218780 A1 | 10/2005 | Chen |
| 2005/0267213 A1 | 12/2005 | Gold et al. |
| 2006/0002108 A1 | 1/2006 | Ouderkirk et al. |
| 2006/0002110 A1 | 1/2006 | Dowling et al. |
| 2006/0164005 A1 | 7/2006 | Sun |
| 2006/0215193 A1* | 9/2006 | Shannon .................. G01J 3/46 358/1.9 |
| 2006/0285193 A1 | 12/2006 | Kimura et al. |
| 2007/0013871 A1 | 1/2007 | Marshall et al. |
| 2007/0159492 A1 | 7/2007 | Lo et al. |
| 2007/0262714 A1 | 11/2007 | Bylsma |
| 2008/0119912 A1 | 5/2008 | Hayes |
| 2008/0143973 A1 | 6/2008 | Wu |
| 2008/0198572 A1 | 8/2008 | Medendorp |
| 2008/0225520 A1* | 9/2008 | Garbus .................... G01J 3/46 362/231 |
| 2008/0232084 A1 | 9/2008 | Kon |
| 2008/0297027 A1* | 12/2008 | Miller et al. .................. 313/498 |
| 2009/0059585 A1 | 3/2009 | Chen et al. |
| 2009/0128781 A1 | 5/2009 | Li |
| 2009/0174342 A1* | 7/2009 | Maxik .......................... 315/291 |
| 2009/0232683 A1 | 9/2009 | Hirata et al. |
| 2009/0273931 A1 | 11/2009 | Ito et al. |
| 2009/0303694 A1 | 12/2009 | Roth et al. |
| 2009/0309513 A1* | 12/2009 | Bergman et al. ............ 315/291 |
| 2010/0001652 A1 | 1/2010 | Damsleth |
| 2010/0006762 A1 | 1/2010 | Yoshida et al. |
| 2010/0051976 A1 | 3/2010 | Rooymans |
| 2010/0053959 A1 | 3/2010 | Ijzerman et al. |
| 2010/0060185 A1* | 3/2010 | Van Duijneveldt .. H04N 1/6086 315/287 |
| 2010/0076250 A1 | 3/2010 | Van Woudenberg |
| 2010/0090619 A1* | 4/2010 | Adamson et al. ............ 315/312 |
| 2010/0103389 A1 | 4/2010 | McVea et al. |
| 2010/0157573 A1 | 6/2010 | Toda et al. |
| 2010/0202129 A1 | 8/2010 | Abu-Ageel |
| 2010/0213859 A1 | 8/2010 | Shteynberg et al. |
| 2010/0231131 A1 | 9/2010 | Anderson |
| 2010/0231863 A1 | 9/2010 | Hikmet et al. |
| 2010/0244700 A1 | 9/2010 | Chong et al. |
| 2010/0244724 A1 | 9/2010 | Jacobs et al. |
| 2010/0244735 A1 | 9/2010 | Buelow, II |
| 2010/0244740 A1 | 9/2010 | Alpert et al. |
| 2010/0270942 A1 | 10/2010 | Hui et al. |
| 2010/0277084 A1 | 11/2010 | Lee et al. |
| 2010/0277097 A1* | 11/2010 | Maxik .......................... 315/294 |
| 2010/0277316 A1 | 11/2010 | Schlangen |
| 2010/0302464 A1 | 12/2010 | Raring et al. |
| 2010/0308738 A1 | 12/2010 | Shteynberg et al. |
| 2010/0315320 A1 | 12/2010 | Yoshida |
| 2010/0320927 A1 | 12/2010 | Gray et al. |
| 2010/0320928 A1 | 12/2010 | Kaihotsu et al. |
| 2010/0321641 A1 | 12/2010 | Van Der Lubbe |
| 2011/0012137 A1 | 1/2011 | Lin et al. |
| 2011/0037390 A1 | 2/2011 | Ko et al. |
| 2011/0080635 A1 | 4/2011 | Takeuchi |
| 2011/0310446 A1 | 12/2011 | Komatsu |
| 2012/0019138 A1* | 1/2012 | Maxik et al. .................. 315/35 |
| 2012/0250137 A1 | 10/2012 | Maxik et al. |
| 2012/0285667 A1 | 11/2012 | Maxik et al. |
| 2012/0286700 A1 | 11/2012 | Maxik et al. |
| 2013/0070439 A1 | 3/2013 | Maxik et al. |

FOREIGN PATENT DOCUMENTS

| | | | |
|---|---|---|---|
| EP | 0851260 | | 7/1998 |
| EP | 1 662 583 A1 | | 5/2006 |
| EP | 1671059 B1 | | 4/2007 |
| EP | 2246611 | * | 11/2010 ............... F21S 8/00 |
| EP | 2292464 A1 | | 9/2011 |
| JP | 2008226567 | | 9/2008 |
| WO | WO03098977 | | 11/2003 |
| WO | WO2004011846 A1 | | 2/2004 |
| WO | WO2006001221 A1 | | 1/2006 |
| WO | WO 2006105649 A1 | | 10/2006 |
| WO | WO2009/121539 A1 | | 10/2009 |
| WO | WO2012064470 | | 5/2012 |
| WO | WO2012135173 | | 10/2012 |
| WO | WO2012158665 | | 11/2012 |
| WO | 2012067916 | | 12/2012 |

OTHER PUBLICATIONS

U.S. Appl. No. 13/709,942, filed Dec. 2012, Fredric S. Maxik et al.
U.S. Appl. No. 13/715,085, filed Dec. 2012, Fredric S. Maxik et al.
U.S. Appl. No. 13/737,606, filed Jan. 2013, Fredric S. Maxik et al.
U.S. Appl. No. 13/739,665, filed Jan. 2013, Fredric S. Maxik et al.
U.S. Appl. No. 13/753,890, filed Jan. 2013, Fredric S. Maxik et al.
U.S. Appl. No. 13/792,354, filed Mar. 2013, Fredric S. Maxik et al.
U.S. Appl. No. 13/803,825, filed Mar. 2013, Fredric S. Maxik et al.
U.S. Appl. No. 13/832,459, filed Mar. 2013, Fredric S. Maxik et al.
U.S. Appl. No. 13/837,643, filed Mar. 2013, Fredric S. Maxik et al.
U.S. Appl. No. 13/842,875, filed Mar. 2013, Eric Holland et al.
Akashi, Yukio, et al., Assessment of Headlamp Glare and Potential Countermeasures: Survey of Advanced Front Lighting System (AFS), U.S. Department of Transportation, National Highway Traffic Safety Administration, Contract No. DTNH22-99-D-07005, (Dec. 2005).
Arthur P. Fraas, Heat Exchanger Design, 1989, p. 60, John Wiley & Sons, Inc., Canada.
Boeing, (Jul. 6, 2011), International Space Program, S684-13489 Revision A "ISS Interior Solid State Lighting Assembly (SSLA) Specification", Submitted to National Aeronautics and Space Administration, Johnson Space Center, Contract No. NAS15-10000, pp. 1-60.
Brainard, et al., (Aug. 15, 2001), "Action Spectrum for Melatonin Regulation in Humans: Evidence for a Novel Circadian Photoreceptor", The Journal of Neuroscience, 21(16):6405-6412.
Binnie et al. (1979) "Fluorescent Lighting and Epilepsy" Epilepsia 20(6):725-727.
Bullough, John, et al., "Discomfort Glare from Headlamps: Interactions Among Spectrum, Control of Gaze and Background Light Level", Society of Automotive Engineers, Inc., 2003-01-0296, (2003).
Charamisinau et al. (2005) "Semiconductor laser insert with Uniform Illumination for Use in Photodynamic Therapy" Appl Opt 44(24):5055-5068.
Derlofske, et al., "Headlamp Parameters and Glare", Society of Automotive Engineers, Inc., 2004-01-1280, (2004).
ERBA Shedding Light on Photosensitivity, One of Epilepsy's Most Complex Conditions. Photosensitivity and Epilepsy. Epilepsy Foundation. Accessed: Aug. 28, 2009. http://www.epilepsyfoundation.org/aboutepilepsy/seizures/photosensitivity-/gerba.cfm.
Figueiro et al. (2004) "Spectral Sensitivity of the Circadian System" Proc. SPIE 5187:207.
Figueiro et al. (2008) "Retinal Mechanisms Determine the Subadditive Response to Polychromatic Light by the Human Circadian System" Neurosci Lett 438(2):242.
Gabrecht et al. (2007) "Design of a Light Delivery System for the Photodynamic Treatment of the Crohn's Disease" Proc. SPIE 6632:1-9.
H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.
Happawana et al. (2009) "Direct De-Ionized Water-Cooled Semiconductor Laser Package for Photodynamic Therapy of Esophageal Carcinoma: Design and Analysis" J Electron Pack 131(2):1-7.
Harding & Harding (1999) "Televised Material and Photosensitive Epilepsy" Epilepsia 40(Suppl. 4):65.

(56) References Cited

OTHER PUBLICATIONS

Hickcox, Sweater K., et al., Lighting Research Center, "Effect of different colored background lighting on LED discomfort glare perception", Proc. of SPIE, vol. 8484, 848400-1, (2012).
Jones, Eric D., Light Emitting Diodes (LEDS) for General Lumination, an Optoelectronics Industry Development Association (OIDA) Technology Roadmap, OIDA Report, Mar. 2001, published by OIDA in Washington D.C.
J. Y. San, C. H. Huang, M. H, Shu, "Impingement cooling of a confined circular air jet", In t. J. Heat Mass Transf., 1997. pp. 1355-1364, vol. 40.
Kooi, Frank, "Yellow Lessens Discomfort Glare: Physiological Mechanism(S)", TNO Human Factors, Netherlands, Contract No. FA8655-03-1-3043, (Mar. 9, 2004).
Kuller & Laike (1998) "The Impact of Flicker from Fluorescent Lighting on Well-Being, Perfiormance and Physiological Arousal" Ergonomics 41(4):433-447.
Lakatos (2006) "Recent trends in the epidemiology of Inflammatory Bowel Disease: Up or Down?" World J Gastroenterol 12(38):6102.
Mace, Douglas, et al., "Countermeasures for Reducing the Effects of Headlight Glare", The Last Resource, Prepared for The AAA Foundation for Traffic Safety, pp. 1 to 110, (Dec. 2001).
Mehta, Arpit, "Map Colors of a CIE Plot and Color Temperature Using an RGB Color Sensor", Strategic Applications Engineer, Maxim Integrated Products, A1026, p. 1-11, (2005).
N. T. Obot, W. J. Douglas, A S. Mujumdar, "'Effect of Semi-confinement on Impingement Heat Transfer", Proc. 7th Int. Heat Transf. Conf., 1982, pp. 1355-1364. vol. 3.
Ortner & Dorta (2006) "Technology Insight: Photodynamic Therapy for Cholangiocarcinoma" Nat Clin Pract Gastroenterol Hepatol 3(8):459-467.
Rea (2010) "Circadian Light" J Circadian Rhythms 8(1):2.

Rea et al. (2010) "The Potential of Outdoor Lighting for Stimulating the Human Circadian System" Alliance for Solid-State Illumination Systems and Technologies (ASSIST), May 13, 2010, p. 1-11.
Rosco Laboratories Poster "Color Filter Technical Data Sheet: #87 Pale Yellow Green" (2001).
Sivak, Michael, et al., "Blue Content of LED Headlamps and Discomfort Glare", The University of Michigan Transportation Research Institute, Report No. UMTRI-2005-2, pp. 1-18, (Feb. 2005).
S. A Solovitz, L. D. Stevanovic, R. A Beaupre, "Microchannels Take Heatsinks to the Next Level", Power Electronics Technology, Nov. 2006.
Stevens (1987) "Electronic Power Use and Breast Cancer: A Hypothesis" Am J Epidemiol 125(4):556-561.
Stockman, Andrew, "The spectral sensitivity of the human short-wavelength sensitive cones derived from thresholds and color matches", Pergamon, Vision Research 39, pp. 2901-2927 (1999).
Tannith Cattermole, "Smart Energy Class controls light on demand", Gizmag.com, Apr. 18, 2010 accessed Nov. 1, 2011.
Topalkara et al. (1998) "Effects of flash frequency and repetition of intermittent photic stimulation on photoparoxysmal responses" Seizure 7(13):249-253.
Veitch & McColl (1995) "Modulation of Fluorescent Light: Flicker Rate and Light Source Effects on Visual Performance and Visual Comfort" Lighting Research and Technology 27:243-256.
Wang (2005) "The Critical Role of Light in Promoting Intestinal Inflammation and Crohn's Disease" J Immunol 174 (12):8173-8182.
Wilkins et al. (1979) "Neurophysical aspects of pattern-sensitive epilepsy" Brain 102:1-25.
Wilkins et al. (1989) "Fluorescent lighting, headaches, and eye-strain" Lighting Res Technol 21(1):11-18.
Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

\* cited by examiner

ADAPTIVE LIGHT SYSTEM AND ASSOCIATED METHODS

RELATED APPLICATIONS

This application claims the benefit of U.S. Provisional Patent Application No. 61/643,316 entitled LUMINAIRE HAVING AN ADAPTABLE LIGHT SOURCE AND ASSOCIATED METHODS filed on May 6, 2012, the entire contents of which are incorporated herein by reference. This application is also related to U.S. patent application Ser. No. 13/234,371 filed Sep. 16, 2011, entitled COLOR CONVERSION OCCLUSION AND ASSOCIATED METHODS, U.S. patent application Ser. No. 13/107,928 filed May 15, 2011, entitled HIGH EFFICACY LIGHTING SIGNAL CONVERTER AND ASSOCIATED METHODS, U.S. patent application Ser. No. 13/174,339 filed Jun. 30, 2011, entitled LED LAMP FOR PRODUCING BIOLOGICALLY-CORRECTED LIGHT, U.S. patent application Ser. No. 12/842,887 filed Jul. 23, 2010, entitled LED LAMP FOR PRODUCING BIOLGICALLY-CORRECTED LIGHT, and U.S. patent application Ser. No. 13/311,300 filed Dec. 5, 2011, entitled TUNABLE LED LAMP FOR PRODUCING BIOLOGICALLY-ADJUSTED LIGHT, the entire contents of each of which are incorporated herein by reference.

FIELD OF THE INVENTION

The present invention relates to systems and methods for producing light. More specifically, the invention relates to systems and methods for dynamically adapting a produced light in response to varying factors.

BACKGROUND OF THE INVENTION

Current lighting devices often employ digital lighting technologies such as light-emitting diodes (LEDs) that generally feature longer operating lives, cheaper operating costs, and wider color ranges than those of legacy lighting devices such as incandescent lamps and fluorescent lamps. However, changing ambient light conditions (e.g., seasonal differences, time of day, subjects in motion) can cause lighting device emissions of a given color to be absorbed by the surrounding environment rather than reflected for perception by the user of the lighting device. Such "light waste" operates counter to the longevity, affordability, and efficiency of lighting devices. Advancements in generation of colored light and adaptation to ambient light hold promise for combating light waste.

Current lighting devices are generally capable of generating light within a diverse color range by combining the emissions of various colored primary light sources. Commonly, devices that combine light to create various colors employ light sources that include red, green, and blue (RGB) colored lights, which are known in the art as primary additive colors or primaries. Additional colors may be created though the combination of these primaries. By combining two primary additive colors in substantially equal quantities, the secondary colors of cyan, magenta, and yellow may be created. Combining all three primary colors may produce white. By varying the luminosity of each color emitted, approximately the full color gamut may be produced.

In general, using fewer lights to produce the full color gamut translates to lower lighting system design and operation costs. For example, in a lighting system that utilizes LEDs, operating every LED at full luminosity to produce a white output color may require using an undesirably large amount of energy and also may produce an excessive amount of heat. Therefore, to emit light of virtually any color within the full color gamut without suffering the shortcomings of the prior art, lighting device implementations in the art are known to add a white light source to supplement the primary color light sources.

U.S. Pat. No. 7,728,846 to Higgins et al. discloses converting an input three-color image data set into an output four-color image data set, where one of the output colors present is white. By including an additional white light source, the white light may provide additional brightness without requiring the primary light sources to operate at full luminosity. However, by adding a new lighting source, the disclosed implementation may not operate with optimal efficiency characteristics based on environmental factors. Furthermore, the disclosed implementation requires the use of light sources defined within the full color gamut to reproduce light in various colors, contributing to inefficient operation.

U.S. Pat. No. 7,324,076 to Lee et al. similarly discloses the use of three or more primary lights in an adaptive lighting solution that receives a user-selected color point, derives tristimulus values for the color point, and controls a plurality of LED drivers for an LED light source to achieve the user-selected color point. However, if the user-selected color point is outside a color selection range of the LED light source, the event is merely flagged as an error and no alternative operation is described. Furthermore, like the Higgins patent, the use of three or more primary light sources to reproduce light in various colors results in operational inefficiency compared to implementations employing fewer than three light sources.

International Pub. No. WO 2006/001221 by Nagai et al. discloses a method for altering the light source color of room illumination in accordance with the season, time of day, and occasion. The illumination source emits light in a light source color created as a result of sufficiently mixing white light from white LEDs and orange light from orange LEDs. However, the light source color is variable without deviating much from a state close to natural light, and without regard for possible absorption of the produced color by the environment surrounding the light source.

A need exists for a light adapter that may accept a source signal defining a selected color, and that may efficiently manipulate less than three color points generated by primary light sources along with a white color point generated by a high efficacy light source to produce a selected color. Additionally, a lighting device with the ability to adapt to a selected color would be able to dynamically increase its efficiency by allowing for reduced light absorption by the lighting device's environment, which is more desirable to both consumers and producers. More specifically, a need exists for a lighting device with the ability to adapt to its environment so that more of its produced light is reflected rather than absorbed, increasing efficiency. Additionally, such a lighting device may need to adapt multiple times to account for changes in its environment.

This background information is provided to reveal information believed to be of possible relevance to the present invention. No admission is necessarily intended, nor should be construed, that any of the preceding information constitutes prior art against the present invention.

SUMMARY OF THE INVENTION

With the foregoing in mind, embodiments of the present invention are related to methods and systems for advantageously adapting the light emissions of a lighting device to enhance a color identified in the environment surrounding the lighting device. More specifically, color adaptation as implemented in the present invention, may allow for increased energy efficiency during lighting device operation by tailoring emissions to a selected color that may be reflected back into an illuminable space. The present invention may further allow for less light absorption by the environment, advantageously resulting in greater brightness as perceived by a user of the lighting device. The present invention may further allow for mixing of the emissions of two color points plus a white color point not only to achieve a selected color but also to minimize power consumption and heat production.

These and other objects, features, and advantages according to the present invention are provided by an adaptive light system to control a lighting device. The adaptive light system may include a color matching engine and a controller operatively coupled to the color matching engine. The adaptive light system may also include a plurality of light sources each configured to emit a source light in a source wavelength range. Each of the plurality of light sources may be operatively coupled to the controller. It is preferable that at least one of the plurality of light sources is a white light.

The color matching engine may determine a dominant wavelength of a selected color. The color matching engine may also determine a combination of at least two of the plurality of light sources that emit a combined wavelength that approximately matches the dominant wavelength of the selected color. The controller may be configured to operate the combination of at least two of the plurality of light sources to emit the combined wavelength, wherein at least one of the plurality of light sources is the white light. Each of the plurality of light sources may be provided by a light emitting diode (LED).

The adaptive light system may also include a color capture device that may transmit a source color signal designating the selected color. In one embodiment, the color capture device may be a handheld device such as a mobile phone, a tablet computer, and a laptop computer. In another embodiment, the color capture device may be a sensor device such as an optical sensor, a color sensor, and a camera.

The adaptive light system may also include a conversion engine that may be coupled to the color capture device and may be configured to perform a conversion operation that operates to receive the selected color. The conversion engine also may determine RGB values of the selected color, and may convert the RGB values of the selected color to XYZ tristimulus values.

The color matching engine may define the dominant wavelength of the selected color as a boundary intersect value that may lie within the standardized color space. The boundary intersect value may be collinear with the XYZ tristimulus values of the selected color and with the tristimulus values of a white point such that the boundary intersect value may be closer to the selected color than to the white point.

The color matching engine may identify a subset of colors within the source wavelength ranges of the source lights emitted by the plurality of light sources, such that the subset of colors may combine to match the dominant wavelength of the selected color. The color matching engine also may choose two of the subset of colors to combine to match the dominant wavelength of the selected color. The choice of colors may include a first color value that may be greater than the dominant wavelength of the selected color, and a second value that may be lesser than the dominant wavelength of the selected color. None of the remaining subset of colors may have a source wavelength nearer to the dominant wavelength of the selected color than either of the first color value and the second color value.

In another embodiment, the choice of colors may include a first color value that may be lesser than the dominant wavelength of the selected color. None of the subset of colors may have a source wavelength greater than the first color value, and none of the subset of colors may have a source wavelength lesser than a second color value.

In yet another embodiment, the choice of colors may include a second color value that may be greater than the dominant wavelength of the selected color. None of the subset of colors may have a source wavelength lesser than the second color value, and none of the subset of colors may have a source wavelength greater than a source wavelength of the first color value.

The color matching engine also may define a color line that contains the XYZ tristimulus values of the selected color and the XYZ tristimulus values of the white point, and also a matching line containing XYZ tristimulus values of the first color and XYZ tristimulus values of the second color. The color matching engine may also identify an intersection point of the color line and the matching line. The color matching engine may also determine a percentage of the first color value and a percentage of the second color value to combine to match the dominant wavelength of the color represented by the intersection point.

The color matching engine may also calculate a ratio of the first color and the second color to combine, and may scale the ratio of the first and second colors to sum to 100%. The color matching engine may also determine a Y value for a combined monochromatic color point that may represent a combination of the first color, the second color, and all remaining monochromatic colors emitted by the light sources.

The color matching engine may also determine XYZ tristimulus values for a combined phosphor color point representing a combination of all phosphor colors emitted by the light sources. The color matching engine may determine a percentage of each of the combination of all phosphor colors needed to match the combined phosphor color point, and may choose a combination of the first color, the second color, all remaining monochromatic colors, and all phosphor colors with a lowest sum of the percentages required to match the selected color.

The color matching engine may also determine XYZ tristimulus values for the combined phosphor color point, and may populate an inverted matrix to contain the XYZ tristimulus values of each of the combination of all phosphor colors. The color matching engine may also multiply the inverted matrix by the XYZ tristimulus values of the combined phosphor color point, and may identify every combination of the first color, the second color, all remaining monochromatic colors, and all phosphor colors to adapt to the selected light. The color matching engine may discard any resultant combination that contains a negative percentage.

A method aspect of the present invention is for adapting a source light. The method may comprise receiving a source color signal representing a selected color, and converting the source color signal to a value representing a dominant wavelength of the selected color. The method may further comprise determining a combination of and percentages of the plurality of light sources that may be combined to emit a combined wavelength that approximately matches the selected color. The method may further comprise operating the two or more light sources along with a white light to emit an adapted light that includes the combined wavelength.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Additionally, in the following detailed description, reference may be made to the driving of light emitting diodes, or LEDs. A person of skill in the art will appreciate that the use of LEDs within this disclosure is not intended to be limited to the any specific form of LED, and should be read to apply to light emitting semiconductors in general. Accordingly, skilled artisans should not view the following disclosure as limited to the any particular light emitting semiconductor device, and should read the following disclosure broadly with respect to the same. Also, a person skilled in the art should notice this description may contain other terminology to convey position, orientation, and direction without departing from the principles of the present invention.

Referring now to FIGS. 1-9, an adaptive light system and associated methods according to the present invention are now described in greater detail. Throughout this disclosure, the adaptive light system may also be referred to as a system or the invention. Alternate references to the adaptive light system in this disclosure are not meant to be limiting in any way.

Figure 1:
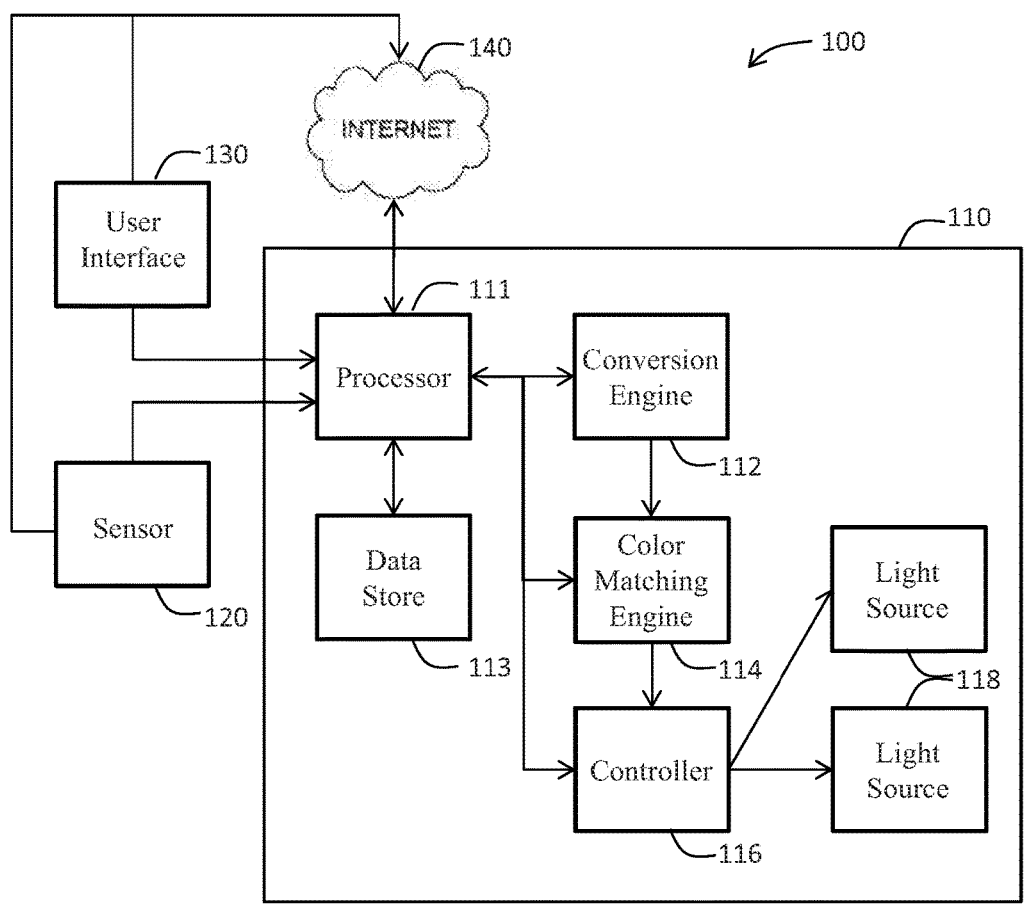
FIG. 1 is a block diagram of an adaptive light system according to an embodiment of the present invention.

Referring now to FIG. 1, an adaptive light system 100 according to an embodiment of the present invention will now be described in greater detail. The logical components of an adaptive light system 100 may comprise a lighting device 110 that may include a conversion engine 112, a color matching engine 114, a controller 116, and a light source 118. For example, and without limitation, the light source 118 may comprise a plurality of LEDs each arranged to generate a source light. A subset of the LEDs in the light source 118 may be arranged to produce a combined light that may exhibit a selected color. The controller 116 may be designed to control the characteristics of the combined light emitted by the light source 118.

A source signal representing the selected color may be conveyed to the lighting device 110 using a color capture device (for example, and without limitation, a sensor 120 and/or a user interface 130 on a remote computing device). More specifically, a color capture device implemented as a sensor 120 may be configured to detect and to transmit to the lighting device 110 color information from the ambient lighting environment that may be located within an illumination range of the light source 118. For example, and without limitation, a sensor 120 may be an environment sensor such as an optical sensor, a color sensor, and a camera. Alternatively or in addition to use of a sensor 120, a user interface 130 on a remote computing device may be configured to convey color information from a user whose visual region of interest may be within an illumination range of the light source 118. For example, and without limitation, the medium for conveyance of color information from the user interface 130 of a remote computing device to the lighting device 110 may be a network 140.

Continuing to refer to FIG. 1, the lighting device 110 may comprise a processor 111 that may accept and execute computerized instructions, and also a data store 113 which may store data and instructions used by the processor 111. More specifically, the processor 111 may be configured to receive the input transmitted from some number of color capture devices 120, 130 and to direct that input to a data store 113 for storage and subsequent retrieval. For example, and without limitation, the processor 111 may be in data communication with a color capture device 120, 130 through a direct connection and/or through a network connection 140.

The conversion engine 112 and the color matching engine 114 may cause the processor 111 to query the data store 113 for color information detected by a color capture device 120, 130, and may interpret that information to identify color points within the lighting capability of the light source 118 that may be used advantageously to enhance a selected color in the environment. More specifically, the conversion engine 112 may perform a conversion operation to convert the source signal to a format that may be interpreted by the matching engine 114 to facilitate a comparison of the selected color to spectral capabilities supported by the light source 118. The controller 116 may cause the processor 111 to query the data store 113 for supported color points identified to enhance the selected color, and may use this retrieved information to generate signals directing the tuning of the spectral output of the light source 118. For example, and without limitation, the controller 116 may generate output signals that may be used to drive a plurality of LEDs in the light source 118.

Referring now to flowchart 200 of FIG. 2 and also to graph 300 of FIG. 3A, a method of matching a selected color by adapting the emission characteristics of a lighting device 110 will now be described in detail. For purposes of definition, the CIE 1931 XYZ color space, created by the International Commission on Illumination, is a red-green-blue (RGB) color space that may be characterized in three dimensions by tristimulus values which represent the luminance and chromaticity of a color (incorporated herein by reference). The chromaticity of a color alternatively may be specified in two dimensions by two derived parameters x and y, defined as two of three normalized values that are functions of the three tristimulus values, shown as X, Y, and Z in Expression A below.

$$x = \frac{X}{X+Y+Z}$$
$$y = \frac{Y}{X+Y+Z}$$
$$z = \frac{Z}{X+Y+Z} = 1 - x - y$$

Expression A

The derived color space specified by x, y, and Y is known as the CIE xyY color space. To return to a three-dimensional representation, the X and Z tristimulus values may be calculated from the chromaticity values x and y and the Y tristimulus value as shown below in Expression B.

$$X = \frac{Y}{y}x$$
$$Z = \frac{Y}{y}(1 - x - y)$$

Expression B

Beginning at Block 205, a color capture device 120, 130 may select a color to which the emissions of the lighting device 110 are to be adapted (Block 210). The conversion engine 112 may convert the RGB values of the selected color to the XYZ tristimulus values 310 of the selected color at Block 220. A skilled artisan will recognize that RGB values are representative of additive color mixing with primary colors of red, green, and blue over a transmitted light. The present disclosure may discuss the adaptive light system 100 of the present invention as converting a selected color, which may be defined in the RGB color space, into a signal generated by the controller 116 comprising three numbers independent of their spectral compositions, that may be defined as XYZ tristimulus values 310. However, a person of skill in the art also will appreciate that additional conversions are intended to be included within the scope and spirit of the present invention. A skilled artisan also will appreciate conversion operations may involve converting a selected color into an output signal to drive light emitting devices in a light source 118.

Figure 2:
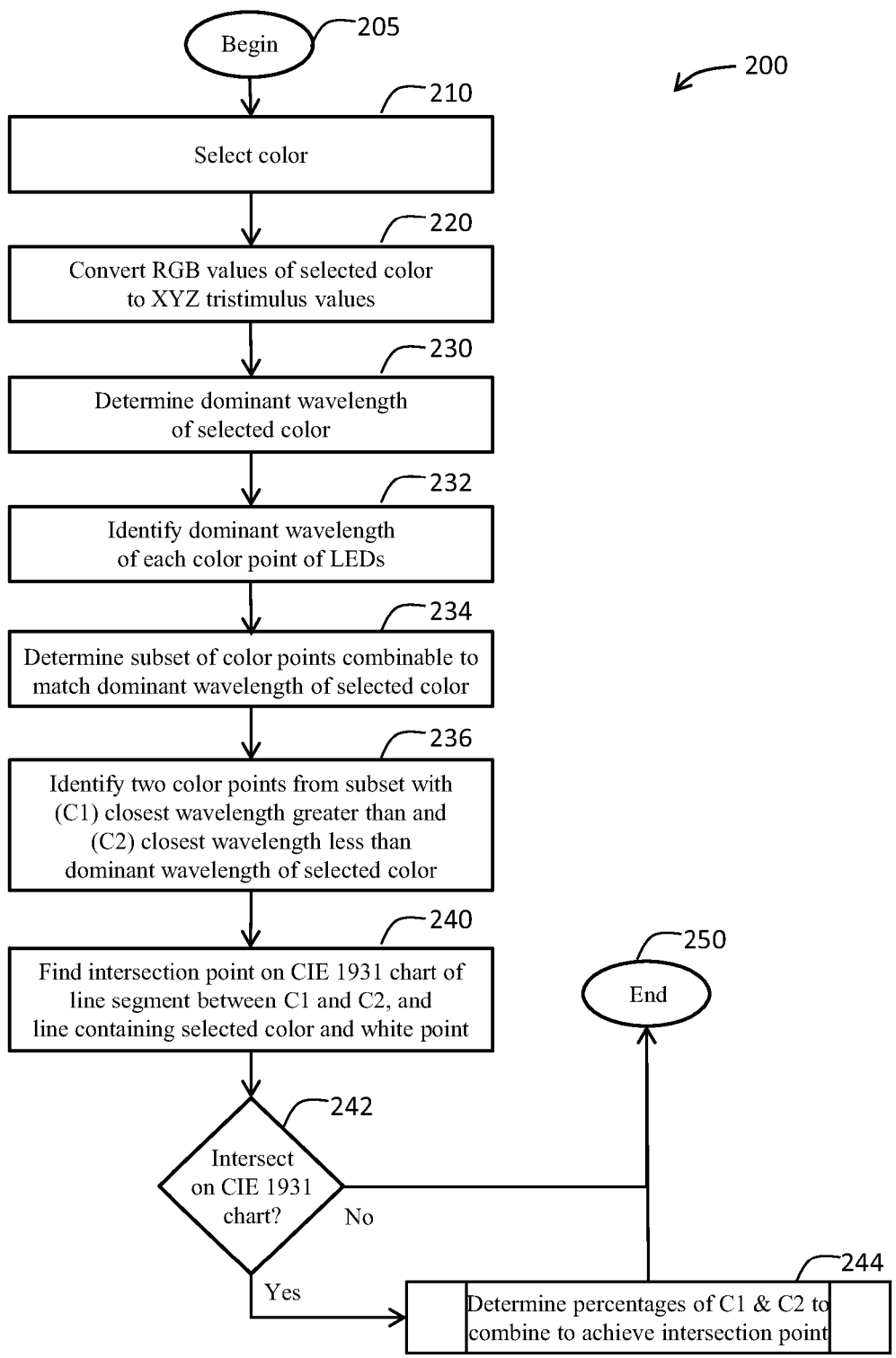
FIG. 2 is a flowchart illustrating a process of matching a selected color using color points emitted by the adaptive light system of FIG. 1.
Figure 3A:
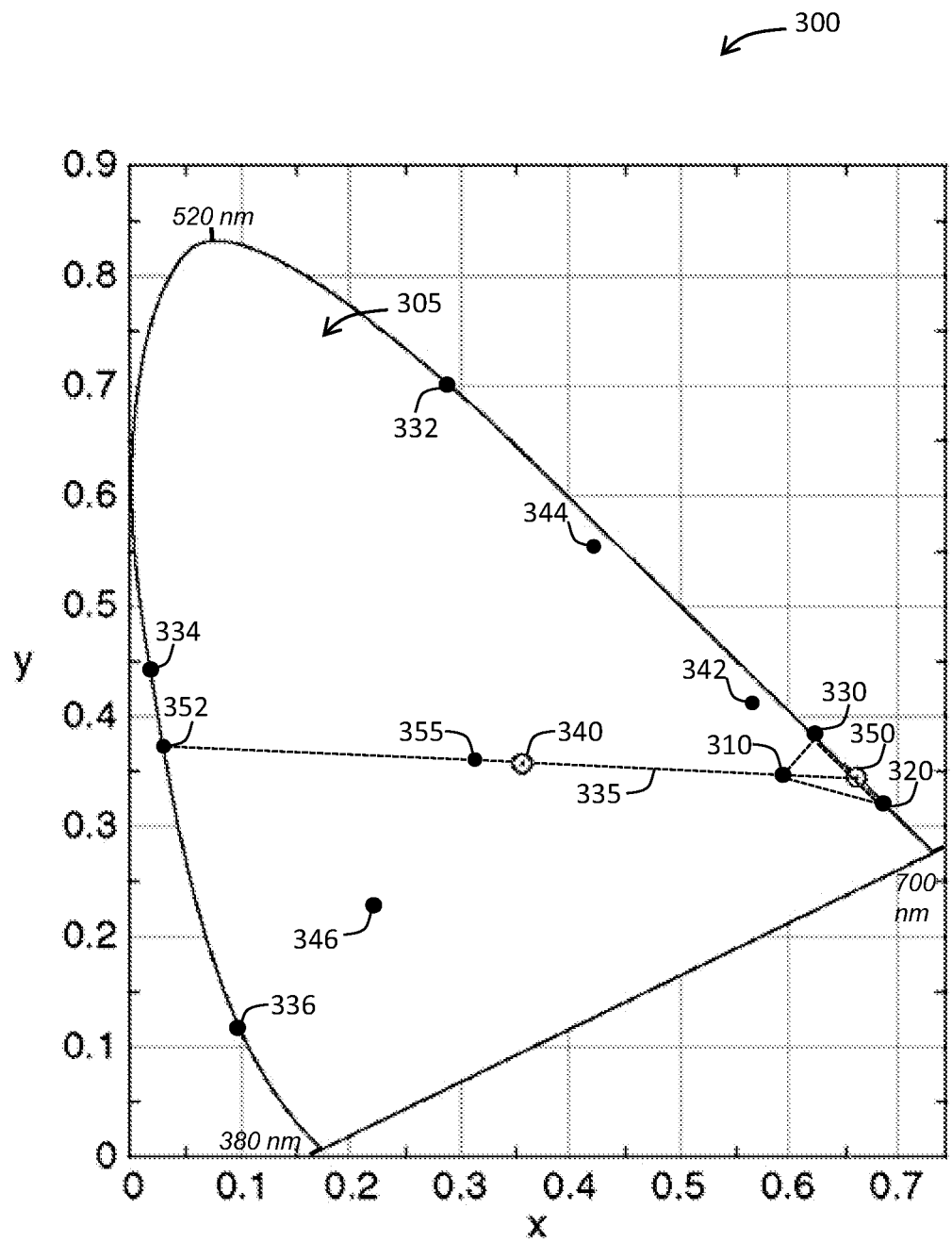
FIG. 3A is a graph illustrating CIE 1931 color coordinates for color point matching variables as mentioned in the process described in FIG. 2.

Continuing to refer to FIGS. 2 and 3A, after converting the values 310 of the selected color, the color matching engine 114 may determine a dominant wavelength of the selected color (Block 230), measured in nanometers (nm). At Block 232, the dominant wavelength of each color point of the LEDs in the light source 118 may be determined by the color matching engine 114. For example, and without limitation, a light source may comprise LEDs of a monochromatic type such as Red 320 (wavelength range 620-645), Amber 330 (wavelength range 610-620), Green 332 (wavelength range 520-550), Cyan 334 (wavelength range 490-520), and Blue 336 (wavelength range 460-490). Also for example, and without limitation, a light source may comprise LEDs of a phosphor type such as Phosphor-Converted Amber 342, Yellow 344, and Blue-White 346.

At Block 234, the method then includes a step of the color matching engine 114 determining a subset of colors emitted by the light source 118 that may be combined to match the dominant wavelength of the selected color (Block 234). From that subset, two light colors emitted by the monochromatic LEDs with wavelengths closest to the selected color's dominant wavelength may be paired. For example, and without limitation, one of the pair of combinable monochromatic colors 320 may have a wavelength greater than the selected color's dominant wavelength, while the other combinable monochromatic color 330 may have a wavelength less than the selected color's dominant wavelength (Block 236). A skilled artisan may recognize that the dominant wavelength may be found by plotting the selected color 310 on a CIE 1931 color chart 300, and drawing a line 335 through the selected color 310 and a reference white point 340. The boundary intersection 350 of the line 335 that is closer to the selected color 310 may be defined as the dominant wavelength, while the boundary intersection 352 of the line 335 that is closer to the white point 340 may be defined as the complementary wavelength.

Figure 3B:
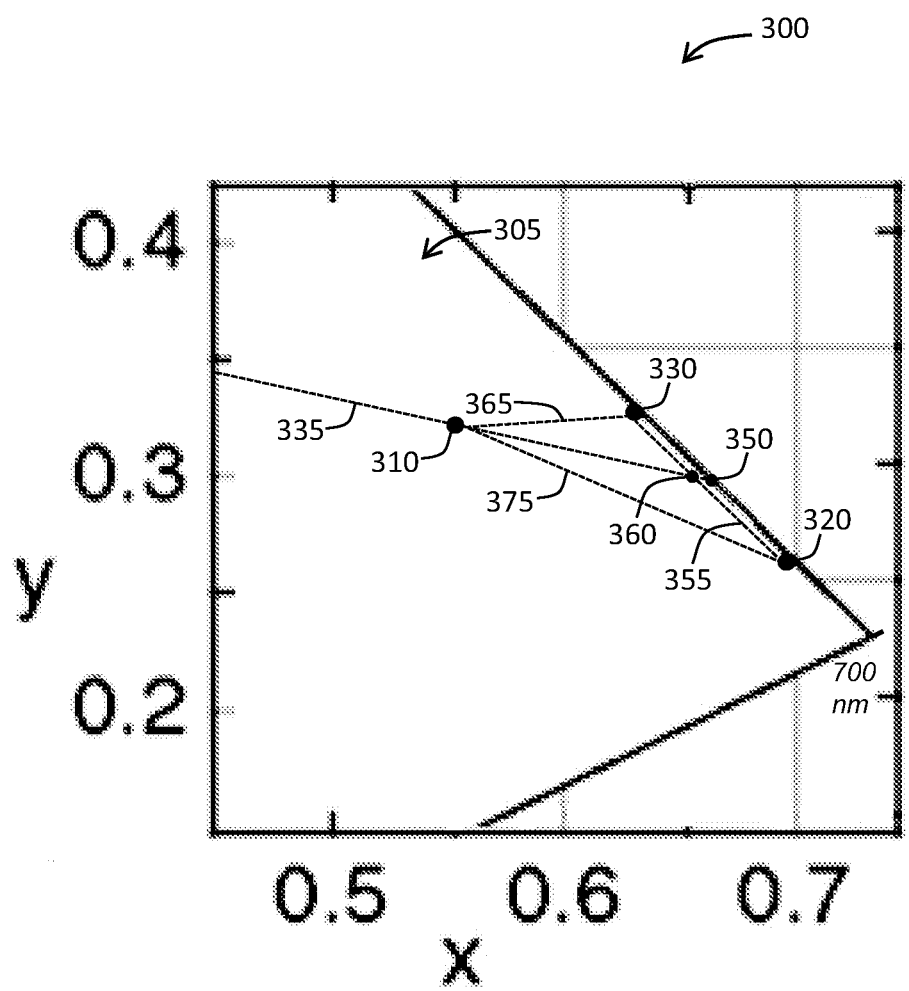
FIG. 3B is a magnified illustration of an area of the graph of FIG. 3A.

Referring additionally to the magnified area of FIG. 3A illustrated in FIG. 3B, the closest-wavelength color points 320, 330 may be added to the color chart 300 with a line 355 drawn between them (Block 240). At Block 242, line 335 and line 355 may be checked for an intersection 360 on the CIE 1931 color chart 300. If no such intersection occurs within the CIE 1931 color space 305, then no color point match may exist with the monochromatic color points 320, 330 having the closest wavelengths. In this instance, the color matching engine 114 may discard the results, after which the process may end at Block 250. If, however, such an intersection does occur on the CIE 1931 color chart 300 at Block 242, the intersection point 360 may be used by the color matching engine 114 to determine the percentage of each of the two adaptable light color points 320, 330 needed to produce the color represented by the intersection point 360 (Block 244). This determination will be discussed in greater detail below. The process 200 of matching a selected color using color points of an adaptable light source 118 ends at Block 250.

Referring to flowchart 244 of FIG. 4 and continuing to refer to graph 300 of FIGS. 3A and 3B, the method by which the color matching engine 114 determines the percentage of each of two color points 320, 330 of an adaptable light source 118 needed to generate the intersection point color 360 will now be described in greater detail. Starting at Block 405, the ratio of the two adaptable light color points 320, 330 may be calculated (Block 410). The ratio is given below in Expression 1.

$$\frac{\left(\frac{l}{w}\right)_1 * |p_s - p_2|}{\left(\frac{l}{w}\right)_2 * |p_s - p_1|} = \frac{r_1}{r_2} \quad \text{Expression 1}$$

In the above Expression 1, $\left(\frac{l}{w}\right)_1 =$ luminous efficacy in lumens per watt of the first adaptable light color point 320, $\left(\frac{l}{w}\right)_2 =$ luminous efficacy in lumens per watt of the second adaptable light color point 330, $|p_s - p_2|$ = the distance 365 between the selected color point 310 and the second adaptable light color point 330, $|p_s - p_1|$ = the distance 375 between the selected color point 310 and the first adaptable light color point 320, and $\frac{r_1}{r_2} =$ the ratio of the two adaptable light colors 320, 330 to be mixed to create a combined monochromatic color point characterized by the x and y coordinates of intersection point 360. This ratio may then be scaled to 100% (Block 420). In other words, $r_1$ and $r_2$ may be multiplied by some number such that the greater of the scaled ratio terms $R_1$, and $R_2$ (representing the first color point 320 and the second color point 330, respectively), equals 100.

Figure 4:
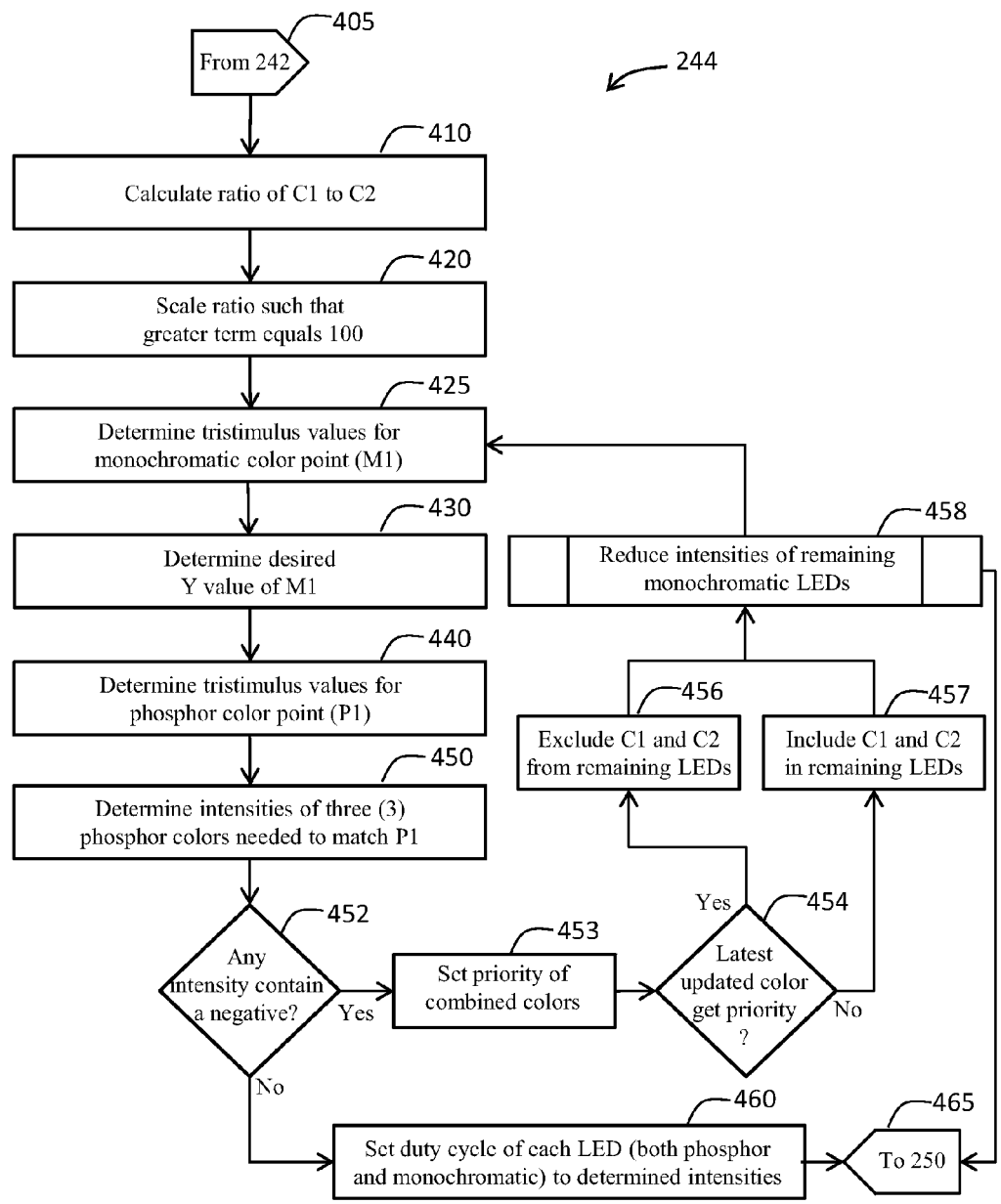
FIG. 4 is a flowchart illustrating a process of determining percentages of color points emitted by the adaptive light system of FIG. 1 to combine to match the selected color as mentioned in the process described in FIG. 2.

Continuing to refer to FIG. 4, the combined monochromatic color point 360 may be defined as the summation of all monochromatic colors in the spectral output of the light source 118 including, for example, and without limitation, the first adaptable color point 320, the second adaptable color point 330, and all remaining monochromatic colors 332, 334, 336. The tristimulus values of the combined monochromatic color point 360 (and, consequently, the xyY point in the CIE 1931 color space 305) may be determined at Block 425. The desired Y value, also known in the art as intensity, of the combined monochromatic color point 360 may be determined at Block 430 using Expression 2 below.

$$Y = R_1 Y_1 + R_2 Y_2 \quad \text{Expression 2}$$

In the above Expression 2, $Y_1$=the Y value of the first adaptable light color point 320, and $Y_2$=the Y value of the second adaptable light color point 330. The resultant intensity of the combined monochromatic color point 360 may be expressed on a scale from 0 percent to 100 percent, where 100 percent ($Y_{max}$) represents the maximum lumen output that the combined monochromatic color point 360 may provide.

After the intensity of the combined monochromatic color point 360 is calculated at Block 430, the tristimulus value for a phosphor color point 355 may be determined at Block 440 by subtracting the xyY value of the selected color point 310 from the xyY value of the white point 340. At Block 450, the intensities of the three phosphor light color points 342, 344, 346 needed to achieve the phosphor color point 355 may be determined by applying an inverted tristimulus matrix containing the tristimulus values of the three phosphor color points 342, 344, 346 multiplied by the tristimulus values of the phosphor color point 355.

If none of the calculated intensity results is determined at Block 452 to contain negative values for the monochromatic light color point 360 (from Block 425) nor for any of the phosphor light color points 342, 344, 346 (from Block 450), then the lowest power load result may be identified as that combination of monochromatic and phosphor color points 360, 342, 344, 346 having the lowest sum of intensities. The result with the lowest sum of intensities, and therefore the least amount of power, may be advantageous in terms of increased efficiency of operation of the lighting device 100. At Block 460, the duty cycle of each monochromatic 320, 330, 332, 334, 336 and phosphor 342, 344, 346 LED may be set by the controller 116 to the intensity determined for each in Block 460, after which the process ends at Block 465.

Continuing to refer to FIG. 4, if any of the calculated intensity results are determined at Block 452 to contain negative values for the monochromatic light color point 360 (from Block 425) or for any of the phosphor light color points 342, 344, 346 (from Block 450), then those results may be discarded from consideration for driving the adaptable light source 118 because, as a skilled artisan will readily appreciate having had the benefit of this disclosure, a negative intensity would imply the removal of a light color, which is inefficient because it requires filtering of an emitted color from the light source 118.

Upon detection of negative intensity results, the color matching engine 114 may initiate recalculation of all color point intensities by changing the priority of the combined colors (Block 453). If, at Block 454, the latest combined color is determined to have been given priority over other combined colors, then the monochromatic LEDs having the first and second adaptable colors 320, 330 in their spectral outputs are omitted from consideration for intensity reduction (Block 456). Alternatively, if the latest combined color is determined at Block 454 not to have been given priority over other combined colors, then the monochromatic LEDs having the first and second adaptable colors 320, 330 in their spectral outputs are included in consideration for intensity reduction at Block 457. Calculation of reductions in the output intensities of all monochromatic LEDs remaining after completion of the steps at either Block 456 or Block 457 takes place at Block 458. This intensity reduction process is described in greater detail below. The color matching engine 114 may use the updated intensities from Block 458 to repeat attempts to determine the percentage of the color points 320, 330 starting at Block 425. After a limited number of recalculation attempts at Block 458, the process may end at Block 465.

Figure 5:
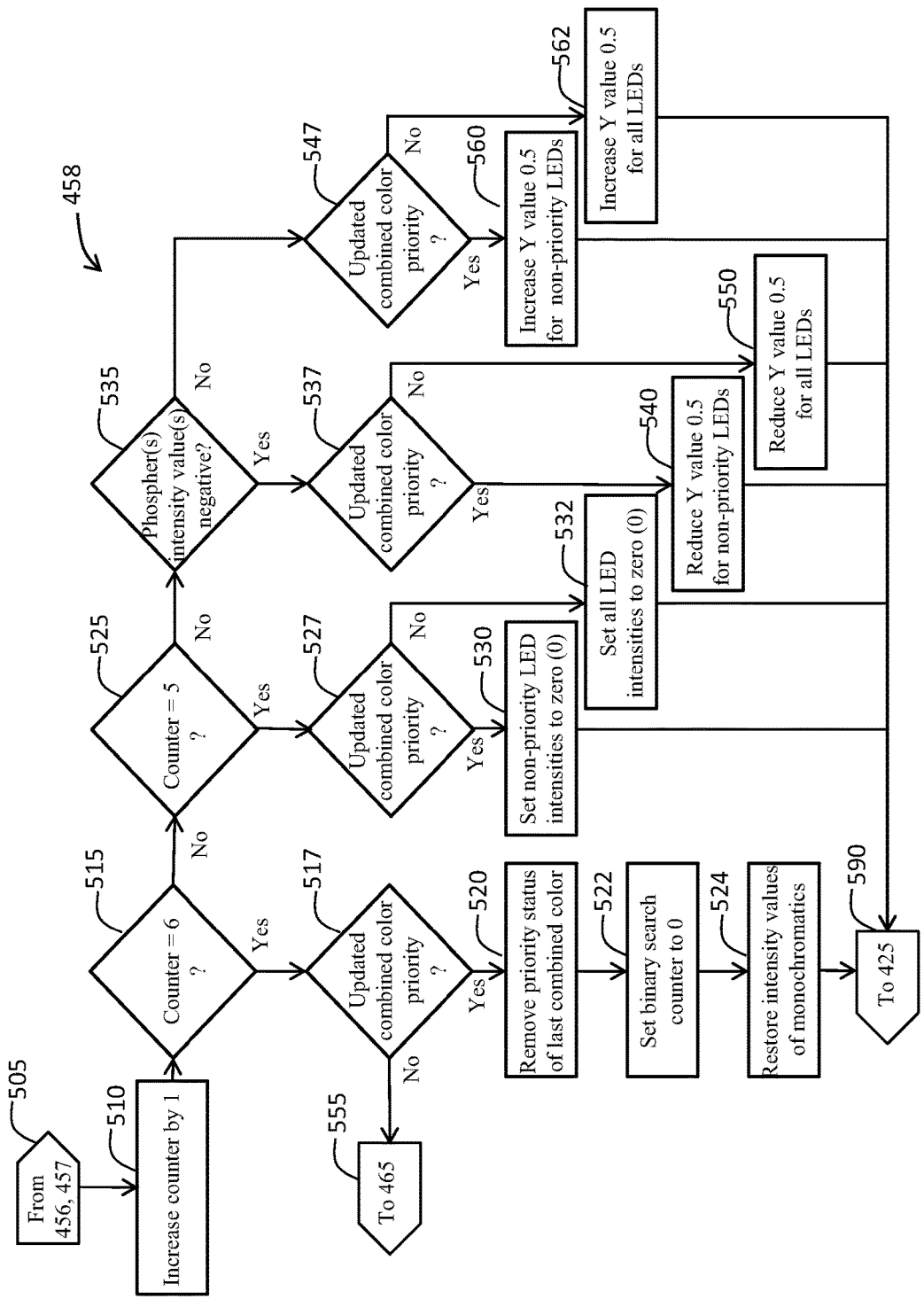
FIG. 5 is a flowchart illustrating a process of determining intensity reductions for combinations of color points emitted by the adaptive light system of FIG. 1 to match the selected color as mentioned in the process described in FIG. 4.

Referring now to the flowchart 458 of FIG. 5 and continuing to refer to graph 300 of FIG. 3A, one embodiment of a method by which the color matching engine 114 may determine a factor for reducing the output intensities of each input monochromatic LED will now be described in greater detail. Starting at Block 505, a counter may be tallied by 1 to track the number of repeated attempts by the color matching engine 114 to recalculate intensities (Block 510).

If at Block 515 the counter has reached six (6), then the color matching engine 114 may determine if the latest updated combined color has been assigned priority over other combined colors (Block 517). If priority was assigned, then the color matching engine 114 may remove the priority status of the last combined color (Block 520), reset the counter to zero (Block 522), and return all monochromatic intensities to their values from completion of Step 420 (Block 524) before returning to Block 425 (Block 590). If priority was not assigned at Block 517, the limitation on the number of recalculation attempts may have been reached at Block 458, and the process may end at Block 465 (Block 555).

If, at Block 515, the counter is determined not to have reached a limit of six (6) recalculation attempts, then the color matching engine 114 may determine if the counter has reached five (5). If so, then the color matching engine 114 may determine if the latest updated combined color has been assigned priority over other combined colors (Block 527). If priority has been assigned, then the color matching engine 114 may set all non-priority monochromatic intensities to a value of zero (Block 530) before returning to Block 425 (Block 590). If priority is not detected at Block 527, then the color matching engine 114 may set all monochromatic intensities to a value of zero (Block 532) before returning to Block 425 (Block 590).

If, at Block 525, the color matching engine 114 determines the counter has not reached five (5) recalculation attempts, then the color matching engine 114 may determine if the Y value of the monochromatic color point 360 resulted in a negative intensity value for one of the phosphor colors 342, 344, 346 (Block 535). If a negative is detected, then the color matching engine 114 may determine if the latest updated combined color has been given a priority over other combined colors (Block 537). If priority is detected, then the color matching engine 114 may reduce the Y value of the non-priority monochromatic LED colors by 0.5 (Block 540) before returning to Block 425 (Block 590). If priority is not detected, then the color matching engine 114 may reduce the Y value of all monochromatic LED colors by 0.5 (Block 550) before returning to Block 425 (Block 590).

If, at Block 535, the Y value of the monochromatic color point 360 did not result in a negative intensity value for one of the phosphor colors 342, 344, 346, then the color matching engine 114 may determine if the latest updated combined color has been given a priority over other combined colors (Block 547). If priority is detected, then the color matching engine 114 may increase the Y value of the non-priority monochromatic LED colors by 0.5 (Block 560) before returning to Block 425 (Block 590). If no priority is detected, then the color matching engine 114 may increase the Y value of all monochromatic LED colors by 0.5 (Block 562) before returning to Block 425 (Block 590).

Another embodiment of the adaptive light system 100 of the present invention also advantageously includes a controller 116 positioned in communication with a network 140 (e.g., Internet) in order to receive signals to adapt the light source. Additional details regarding communication of signals to the adaptive light system 100 are found below, but can also be found in U.S. Provisional Patent Application Ser. No. 61/486,314 entitled Wireless Lighting Device and Associated Methods, as well as U.S. patent application Ser. No. 13/463,020 entitled Wireless Pairing System and Associated Methods, and U.S. patent application Ser. No. 13/269,222 entitled Wavelength Sensing Light Emitting Semiconductor and Associated Methods, the entire contents of each of which are incorporated herein by reference.

There exist many exemplary uses for the adaptive light system 100 according to an embodiment of the present invention. For example, in a case where advantageous reflection a selected color into an illuminable space is desired (e.g., a color of a particular flower at a florist, a display in a store), the light source 118 of the adaptive light system 100 according to an embodiment of the present invention may be readily adapted to emit a light having a particular wavelength suitable for enhancing the selected color.

Figure 6:
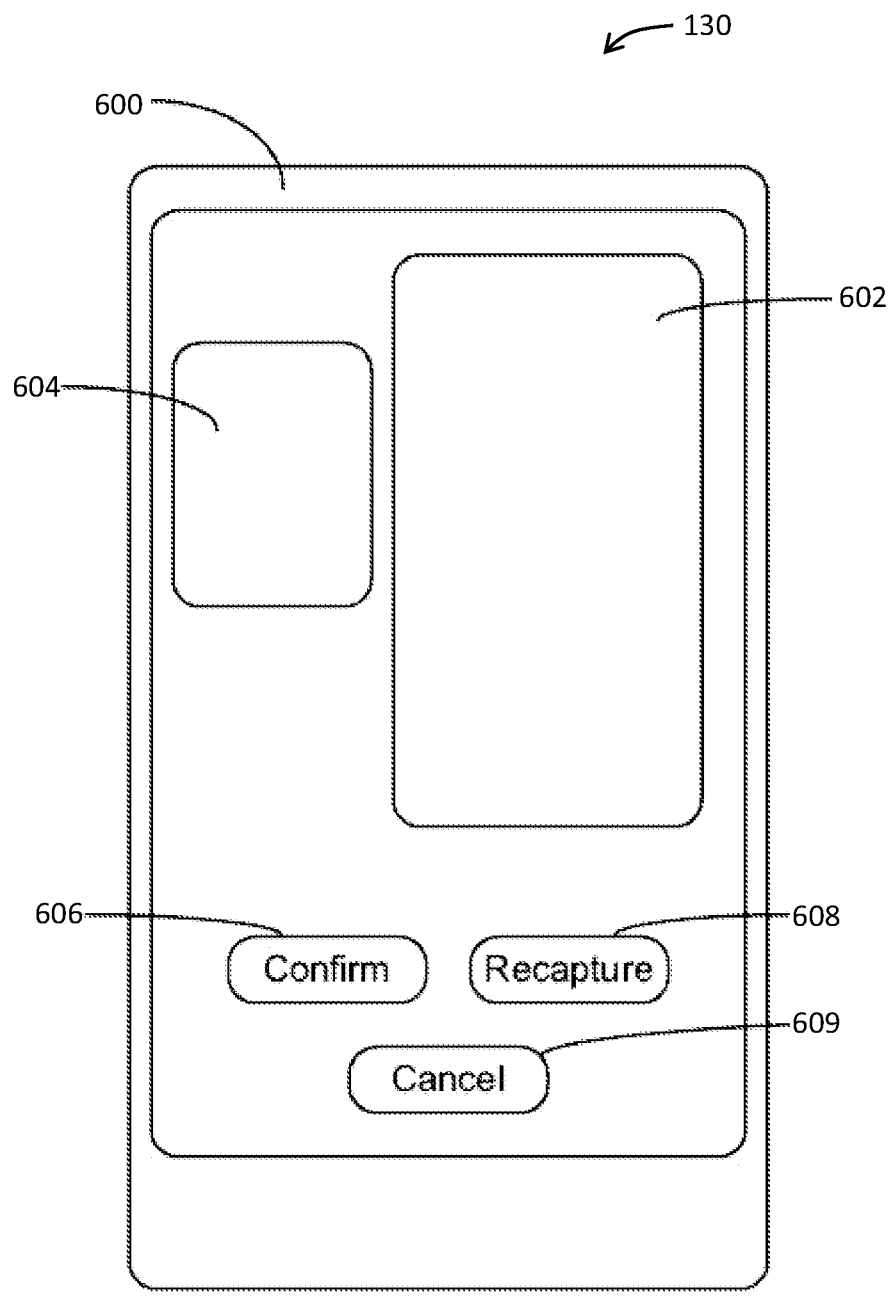
FIG. 6 is a schematic diagram of an exemplary user interface to be used in connection with the adaptive light system of FIG. 1.

Referring now to FIG. 6, an exemplary user interface 130 will be discussed. The user interface 130 may be provided by a handheld device 600, such as, for example, any mobile device, or other network connectable device, which may display a picture 602 having a selected color therein. Once a picture has been taken by a user, a detected color 604 may be displayed, with the option for the user to confirm that the detected color is the selected color. The user may confirm this choice by selecting a confirm button 606. The user may also recapture the image using a recapture button 608, or may cancel the adaptation operation using a cancel button 609. Those skilled in the art will appreciate that this is but one embodiment of a user interface 130 that may be used. It is contemplated, for example, that the user interface 130 may not include a picture of the color 602 and may, instead, simply send a signal to adapt the light source 118 of the lighting device 110 to a emit a wavelength to enhance particular colors. For example, and without limitation, the user may be enabled to select a wavelength to enhance blues in general. Further, it is contemplated that the user interface 130 may be provided by an application that is downloadable and installable on a mobile phone and over a mobile phone (or other handheld device) network.

Figure 7:
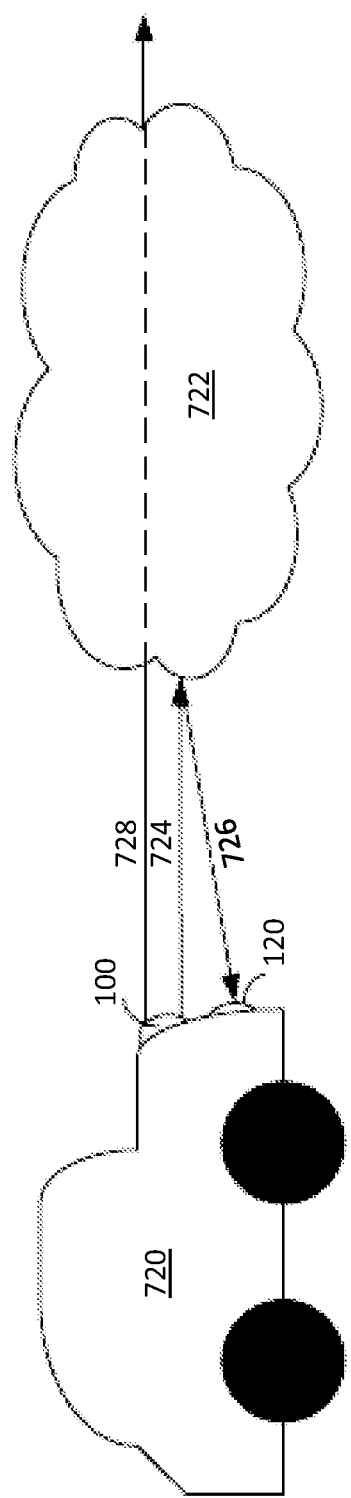
FIG. 7 is a schematic diagram of an adaptive light system according to an embodiment of the present invention in use in an automobile.

Referring now to FIG. 7, the adaptive light system 100 of the present invention is shown in use in an automobile 720. The adaptive light system 100 may emit a source light 724 during normal operation, and may be switched to emit an adapted light 728 either automatically in the presence of fog 722 or other obstructing environment, or manually by a user. In such an embodiment, it is contemplated that the adaptive light system 100 may include a sensor 120, or may be positioned in communication with a sensor 120. The sensor 120 may, for example, be an optical sensor, that is capable of sensing environmental conditions that may obstruct a view of a driver. Fog 722, for example, may pose a danger during driving by obstructing the view of the driver. If the sensor 120 detects reflected light 726 which has failed to permeate the fog 722, the sensor may be able to choose an appropriate adapted light 728 which may allow the user to see through the fog 722 more clearly. It is contemplated that such an application may be used in an automatic sense, i.e., upon sensing the environmental condition, the light source 118 on the lighting device 110 may be readily adapted to emit a wavelength that enhances other colors so that the path before the driver is more readily visible.

Figure 8A:
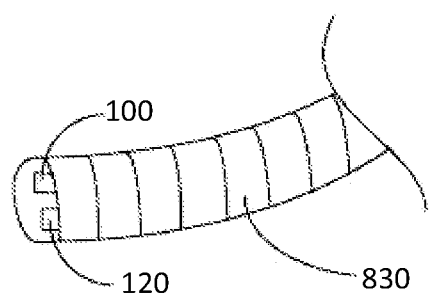
FIG. 8A is a schematic diagram of an adaptive light system according to an embodiment of the present invention in use in a surgical scope.
Figure 8B:
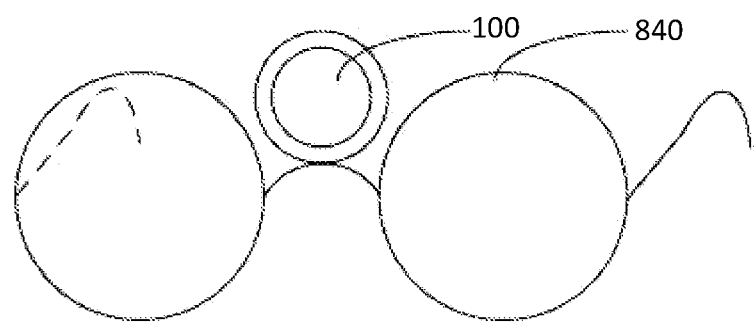
FIG. 8B is a schematic diagram of an adaptive light system according to an embodiment of the present invention in use in connection with a surgeon's glasses.

The adaptable lighting system 100 may also prove advantageous in the field of surgery. Referring now to FIGS. 8A and 8B, an adaptable lighting system 100 is shown for use in a surgical scope 830 having a camera 120, and additionally for use as an attachment to a surgeon's glasses 840. The adaptable lighting system 100 may be programmed to illuminate and emphasize colors of critical areas that need to be removed such as cancerous cells, and also areas that need to be avoided such as arteries and nerves. Both surgical scopes 830 and surgeon's glasses 840 may be used in surgery, but may also be readily retrofitted with adaptable lighting systems 100 which may advantageously provide a low-cost method of improving patient safety and reducing medical error. The uses described above are provided as examples, and are not meant to be limiting in any way.

Figure 9:
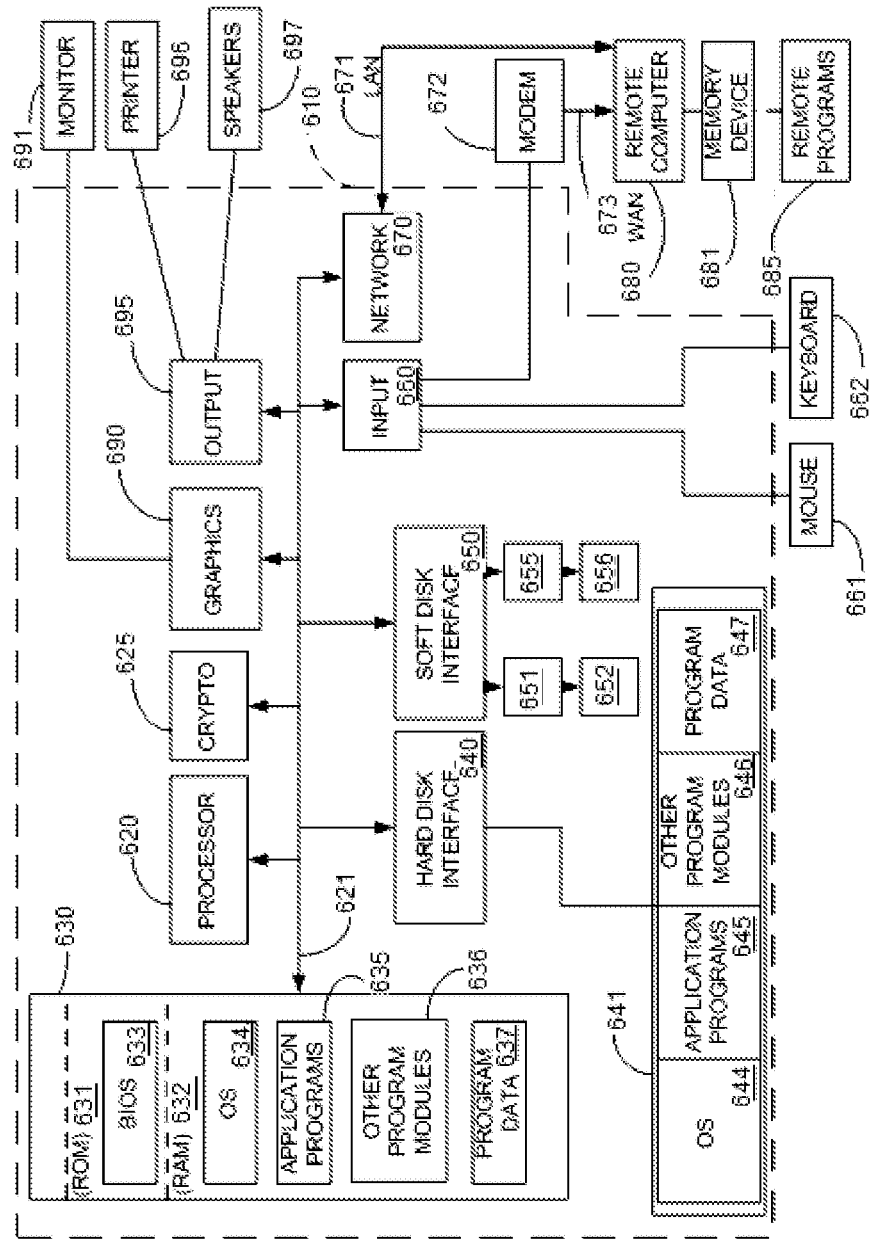
FIG. 9 is a block diagram representation of a machine in the example form of a computer system according to an embodiment of the present invention.

A skilled artisan will note that one or more of the aspects of the present invention may be performed on a computing device. The skilled artisan will also note that a computing device may be understood to be any device having a processor, memory unit, input, and output. This may include, but is not intended to be limited to, cellular phones, smart phones, tablet computers, laptop computers, desktop computers, personal digital assistants, etc. FIG. 9 illustrates a model computing device in the form of a computer 610, which is capable of performing one or more computer-implemented steps in practicing the method aspects of the present invention. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI).

The computer 610 may also include a cryptographic unit 625. Briefly, the cryptographic unit 625 has a calculation function that may be used to verify digital signatures, calculate hashes, digitally sign hash values, and encrypt or decrypt data. The cryptographic unit 625 may also have a protected memory for storing keys and other secret data. In other embodiments, the functions of the cryptographic unit may be instantiated in software and run via the operating system.

A computer 610 typically includes a variety of computer readable media. Computer readable media can be any available media that can be accessed by a computer 610 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 9 illustrates an operating system (OS) 634, application programs 635, other program modules 636, and program data 637.

The computer 610 may also include other removable/non-removable, volatile/nonvolatile computer storage media. By way of example only, FIG. 9 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives, and their associated computer storage media discussed above and illustrated in FIG. 9, provide storage of computer readable instructions, data structures, program modules and other data for the computer 610. In FIG. 9, for example, hard disk drive 641 is illustrated as storing an OS 644, application programs 645, other program modules 646, and program data 647. Note that these components can either be the same as or different from OS 633, application programs 633, other program modules 636, and program data 637. The OS 644, application programs 645, other program modules 646, and program data 647 are given different numbers here to illustrate that, at a minimum, they may be different copies. A user may enter commands and information into the computer 610 through input devices such as a keyboard 662 and cursor control device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a graphics controller 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 9. The logical connections depicted in FIG. 9 include a local area network (LAN) 671 and a wide area network (WAN) 673, but may also include other networks 140. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 9 illustrates remote application programs 685 as residing on memory device 681.

The communications connections 670 and 672 allow the device to communicate with other devices. The communications connections 670 and 672 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A method of adapting light using a lighting device that includes a color matching engine, a conversion engine, a controller, a processor programmed to execute each of the color matching engine and the conversion engine and operatively coupled to the controller, and a plurality of light sources each configured to emit a source light in a source wavelength range, wherein each of the plurality of light sources is operatively coupled to the controller, wherein at least one of the plurality of light sources is a white light, the method comprising:

receiving a source color signal designating a selected color;
determining RGB values of the selected color;
converting the RGB values of the selected color to XYZ tristimulus values;
determining a boundary intersect value, being a dominant wavelength of the selected color within a color space that is collinear with the XYZ tristimulus values of the selected color and XYZ tristimulus values of a white point, such that the boundary intersect value is closer to the XYZ tristimulus values of the selected color than to the XYZ tristimulus values of the white point;
determining a combination of at least two of the plurality of light sources that emit a combined wavelength that approximately matches the dominant wavelength of the selected color, comprising the steps of:
identifying a subset of colors within the source wavelength ranges of the source lights emitted by the plurality of light sources such that the subset of colors combine to match the dominant wavelength of the selected color,
choosing two or more of the subset of colors to combine to match the dominant wavelength of the selected color to include a first color value including a first color of a source wavelength and a second color value including a second color of a source wavelength defined as a second color value,
defining a color line containing the XYZ tristimulus values of the selected color and the XYZ tristimulus values of the white point,
defining a matching line containing XYZ tristimulus values of the first color and XYZ tristimulus values of the second color,
identifying an intersection color, which is an intersection point of the color line and the matching line,
calculating a ratio of the first color and the second color to combine,
scaling the ratio of the first color and the second color to sum to 100%,
determining a Y value for a combined monochromatic color point, the combined monochromatic color point being a combination of the first color, the second color, and all remaining monochromatic colors in the source lights emitted by the plurality of light sources,
determining XYZ tristimulus values for a combined phosphor color point, the combined phosphor color point defined as a combination of all phosphor colors in the source lights emitted by the plurality of light sources,
determining a percentage of each of the combination of all phosphor colors needed to match the combined phosphor color point, and
choosing a produced color, the produced color defined as a combination of the first color and the second color with a lowest sum of the percentages of the first color, the second color, the all remaining monochromatic colors, and the all phosphor colors required to match the selected color; and
operating the combination of at least two of the plurality of light sources to emit an adapted light, which comprises the combined wavelength, wherein at least one of the plurality of light sources is the white light.

2. A method according to claim 1 wherein at least one of the plurality of light sources comprises a light emitting diode (LED).

3. A method according to claim 1 wherein the source wavelength associated with the first color value is greater than the dominant wavelength of the selected color; wherein the source wavelength associated with the second value is lesser than the dominant wavelength of the selected color; and wherein none of the remaining subset of colors has a source wavelength nearer to the dominant wavelength of the selected color than either of the source wavelengths associated with the first color value and the second color value.

4. A method according to claim 1 wherein the source wavelength associated with the first color value is lesser than the dominant wavelength of the selected color; and wherein none of the subset of colors has a source wavelength greater than the first color value, and none of the subset of colors has a source wavelength lesser than a source wavelength of the second color value.

5. A method according to claim 1 wherein the source wavelength associated with the second color value is greater than the dominant wavelength of the selected color; and
wherein none of the subset of colors has a source wavelength lesser than the second color value, and none of the subset of colors has a source wavelength greater than a source wavelength of the first color value.

6. A method according to claim 1 wherein determining a percentage of each of the combination of all phosphor colors needed to match the combined phosphor color point further comprises:
determining XYZ tristimulus values for the combined phosphor color point;
populating an inverted matrix to contain XYZ tristimulus values of each of the combination of all phosphor colors;
multiplying the inverted matrix by the XYZ tristimulus values of the combined phosphor color point;
identifying every combination of the first color, the second color, the all remaining monochromatic colors, and the all phosphor colors to create the adapted light; and
discarding any resultant combination that contains a negative percentage.

7. A method according to claim 6 wherein discarding any resultant combination that contains a negative percentage further comprises:
changing a priority for the combined monochromatic colors; and
reducing the intensity of each of the combined monochromatic colors based on the priority for the combined monochromatic colors.

8. An adaptive light system to control a lighting device comprising:
a color matching engine;
a conversion engine;
a controller; and
a processor programmed to execute each of the color matching engine and the conversion engine and operatively coupled to the controller;
a plurality of light sources each configured to emit a source light in a source wavelength range, wherein each of the plurality of light sources is operatively coupled to the controller and at least one of the plurality of light sources is a white light;
wherein the conversion engine comprises a conversion operation that operates to receive a source color signal designating a selected color, to determine RGB values of the selected color, and to convert the RGB values of the selected color to XYZ tristimulus values;
wherein the color matching engine comprises a matching operation that operates to determine a dominant wavelength of the selected color defined as a boundary intersect value within a color space that is collinear with the XYZ tristimulus values of the selected color and XYZ trisimulus values of a white point, and such that the boundary intersect value is closer to the XYZ tristimulus values of the selected color than to the XYZ tristimulus values of the white point, and to determine a combination of at least two of the plurality of light sources that emit a combined wavelength that approximately matches the dominant wavelength of the selected color,
wherein the color matching engine comprises an identifying operation that operates to identify a subset of colors within the source wavelength ranges of the source lights emitted by the plurality of light sources such that the subset of colors combine to match the dominant wavelength of the selected color;
wherein the color matching engine comprises a choosing operation that operates to choose two or more of the subset of colors to combine to match the dominant wavelength of the selected color to include a first color of a source wavelength defined as a first color value and a second color of a source wavelength defined as a second color value to define a color line containing the XYZ tristimulus values of the selected color and the XYZ tristimulus values of the white point, to define a matching line containing the XYZ tristimulus values of the first color and the XYZ tristimulus values of the second color, and to identify an intersection point of the color line and the matching line, defined as an intersection color;
wherein the matching engine comprises a production operation that operates to determine a percentage of the first color value and a percentage of the second color value to combine to match the dominant wavelength of the intersection color to perform a ratio calculation operation that operates to calculate a ratio of the first color and the second color to combine, to perform a ratio scaling operation that operates to scale the ratio of the first color and the second color to sum to 100%, to perform a luminescence calculation operation that operates to determine a Y value for a combined monochromatic color point, the combined monochromatic color point defined as a combination of the first color, the second color, and all remaining monochromatic colors in the source lights emitted by the plurality of light sources, to perform a phosphoric identification operation that operates to determine XYZ tristimulus values for a combined phosphor color point, the combined phosphor color point defined as a combination of all phosphor colors in the source lights emitted by the plurality of light sources, to perform a color combination operation that operates to determine a percentage of each of the combination of all phosphor colors needed to match the combined phosphor color point, and to choose a produced color, the produced color defined as a combination of the first color and the second color with a lowest sum of percentages of the first color, the second color, the all remaining monochromatic colors, and the all phosphor colors required to match the selected color; and
wherein the controller is configured to operate the combination of at least two of the plurality of light sources to emit the combined wavelength to be defined as an adapted light, wherein at least one of the plurality of light sources is the white light.

9. A system according to claim 8 wherein at least one of the plurality of light sources comprises a light emitting diode (LED).

10. A system according to claim 8 wherein the first color value is greater than the dominant wavelength of the selected color; wherein the second value is lesser than the dominant wavelength of the selected color; and wherein none of the subset of colors has a source wavelength nearer to the dominant wavelength of the selected color than either of the first color value and the second color value.

11. A system according to claim 8 the first color value is lesser than the dominant wavelength of the selected color;

and wherein none of the subset of colors has a source wavelength greater than the first color value, and none of the subset of colors has a source wavelength lesser than the second color value.

12. A system according to claim 8 wherein the second color value is greater than the dominant wavelength of the selected color; and wherein none of the subset of colors has a source wavelength lesser than the second color value, and none of the subset of colors has a source wavelength greater than a source wavelength of the first color value.

13. A system according to claim 8 wherein the color combination operation further operates to determine XYZ tristimulus values for the combined phosphor color point; to populate an inverted matrix to contain XYZ tristimulus values of each of the combination of all phosphor colors; to multiply the inverted matrix by the XYZ tristimulus values of the combined phosphor color point; to identify every combination of the first color, the second color, the all remaining monochromatic colors, and the all phosphor colors to create the adapted light; and to discard any resultant combination that contains a negative percentage.

14. A system according to claim 8 further comprising a color capture device; and wherein the conversion engine is configured to be operable on information generated by the color capture device.

15. A system according to claim 14 wherein the color capture device is a handheld device selected from the group consisting of a mobile phone, a tablet computer, and a laptop computer.

16. A system according to claim 14 wherein the color capture device is a sensor device selected from the group consisting of an optical sensor, a color sensor, and a camera.

* * * * *